July 28, 1970  H. E. FRENCH  3,521,954
ELECTRO-OPTIC APPARATUS AND METHOD FOR MODIFYING
CONTRAST IN PHOTOGRAPHIC IMAGES
Filed April 8, 1968  2 Sheets-Sheet 1

HOLLIS E. FRENCH
INVENTOR.

BY Joseph S. Iandiorio

ATTORNEY.

July 28, 1970                H. E. FRENCH                3,521,954
            ELECTRO-OPTIC APPARATUS AND METHOD FOR MODIFYING
                    CONTRAST IN PHOTOGRAPHIC IMAGES
Filed April 8, 1968                              2 Sheets-Sheet 2

HOLLIS E. FRENCH
       INVENTOR.

BY Joseph S. Iandiorio
           ATTORNEY.

United States Patent Office 3,521,954
Patented July 28, 1970

3,521,954
ELECTRO-OPTIC APPARATUS AND METHOD FOR MODIFYING CONTRAST IN PHOTOGRAPHIC IMAGES
Hollis Edward French, North Chelmsford, Mass., assignor to Itek Corporation, Lexington, Mass., a corporation of Delaware
Filed Apr. 8, 1968, Ser. No. 719,588
Int. Cl. G03b 27/72
U.S. Cl. 355—80                                25 Claims

ABSTRACT OF THE DISCLOSURE

Apparatus is disclosed for modifying the contrast of a photographic image during printing by irradiating a photo-conductive material through an image-bearing transparency to be printed, applying an electric field across the photoconductive material and an electro-optic material to vary a characteristic of the electro-optic material in a pattern corresponding to the density distribution of the transparency, and exposing a photosensitive medium to a component of the radiation modulated by the electro-optic material in a pattern corresponding to the density distribution of the transparency.

CHARACTERIZATION OF INVENTION

The invention is characterized in a method of modifying the contrast of a photographic image during printing comprising exposing a photoconductive material with input radiation through an image-bearing transparency to vary the conductance of the photoconductive material in a pattern corresponding to the density distribution of the image borne by the transparency, applying, across the photoconductive material and an electro-optic material, an electric field which varies at the electro-optic material as a function of the conductance pattern of the photoconductive material, exposing the electro-optic material to input radiation, and exposing a photosensitive medium to a portion of the modulated output radiation produced by the electro-optic material, the intensity of that portion of the modulated output radiation varying in a pattern corresponding to the density distribution of the image borne by the transparency.

BACKGROUND OF THE INVENTION

This invention relates to a method and apparatus for modifying the contrast of photographic images during printing and more particularly to dodging, decreasing contrast, and enhancing, increasing contrast, of photographic images.

Dodging, decreasing the contrast of photographic images, is a process in which the density levels of the original film transparency are effectively compressed into the range of sensitivity of the emulsion on the photosensitive medium which is exposed through the transparency to produce a photographic print or reproduction. Typically, the transparency is an original negative and dodging may be accomplished by inserting a positive mask of the original negative between the exposing light source and the original negative. The positive mask attenuates the light directed toward the less dense areas of the original negative to a greater degree than it attenuates the light directed toward the more dense areas of the original negative. The result is a print having greater clarity of detail because the exposure levels are within the most sensitive and substantially linear portion of the sensitivity curve, i.e. the density vs. log of exposure $(D/\log E)$ curve, of the emulsion of the photosensitive medium.

Dodging may also be accomplished by using a phosphor quenching technique in which ultra-violet light is used to excite a fluorescent surface to produce actinic light to expose a photosensitive medium. A source of near infrared light directed through the negative quenches the surface and attenuates the actinic light output of the surface in inverse proportion of the density of the negative: areas of the surface shielded from the near infra-red light by high density portions of the negative receive less quenching near infra-red light and produce more actinic light while areas of the surface shielded by low density portions of the negative receive more quenching near infra-red light and produce less actinic light.

Image enhancing is a process in which the intensity of the exposure radiation passing through low density areas of the negative is increased and the intensity of the exposure radiation passing through high density areas of the negative is decreased to increase the contrast of the images.

In many cases important information is derivable from the underexposed or shadow areas of photographic images but is lost because of the poor contrast available at low exposure levels of the film. These underexposed or shadow areas which appear as dark areas on the positive photograph and in the originally photographed scene appear as light or low density areas on the negative film. The lighter or less dense areas of the negative lie on a non-linear portion of the characteristic curve of the film. The characteristic curve is a plot of density vs. logarithm of exposure $(D/\log E)$ where the density is the ordinate and the log of the exposure the abscissa. Both the density and log of exposure increase as distance from the origin increases in such a plot, but for the first part of that curve the density does not increase linearly compared to the log exposure value, and in the initial stages of that first part, where exposure is low, only small differences in density are observable for relatively substantial differences in exposure. The result is that information in this area is usually indiscernible because of the lack of contrast. Image enhancement is an attempt to make such information more discernible by increasing the contrast of the image.

SUMMARY OF INVENTION

Thus it is desirable to have available a new method and means capable of modifying the contrast of photographic images.

It is also desirable to have available such method and means capable of increasing or decreasing the contrast of photographic images.

It is also desirable to have available such method and means for applying the density distribution pattern of the image to establish a conductance pattern in a photoconductive material which is used to provide final print exposure radiation in a pattern whose intensity varies directly or inversely proportionally to the density distribution pattern of the image.

It is also desirable to have available such method and means wherein the final print exposure radiation varies in direct proportion to the density of the image and may be used for dodging.

It is also desirable to have available such method and means wherein the final print exposure radiation varies in inverse proportion to the density of the image and may be used for image enhancing.

The invention may be accomplished by a photoconductive material whose conductance varies in proportion to the intensity of applied radiation, an electro-optic material, associated with the photoconductive material, exhibiting a charatceristic that varies with variations of an applied electric field to produce, when exposed to input radiation, modulated output radiation whose modulation varies with variations in the applied electric field, and means for exposing the photoconductive material through an image-bearing transparency. An electric field is applied across the photoconductive and electro-optic materials so that at the electro-optic material the field varies in a pattern corresponding to that of the conductance pattern of the photoconductive material, and a portion of the modulated output radiation from the electro-optic material is used to expose a photosensitive medium.

DISCLOSURE OF SPECIFIC EMBODIMENTS

Other objects, features and advantages will appear from the following description of preferred embodiments of the invention, and the accompanying drawings, in which.

Figure 1:
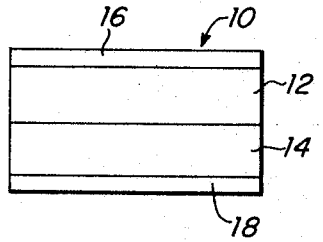
FIG. 1 is a diagrammatic side view of an element having photoconductive and electro-optic layers usable according to this invention.

In one embodiment of the invention a light source supplies plane polarized light to photoconductive material through an image-bearing transparency sought to be printed. A conductance pattern which varies in indirect correspondence with the density of the transparency is thus established in that material. An electric field applied across the photoconductive material and an electro-optic material establishes itself across the electro-optic material in a pattern which is directly proportional to the conductance pattern in the photoconductive material: the photoconductive material provides a voltage divider effect so that the voltage and the field are highest across area of the electro-optic material adjacent high conductance areas of the photoconductive material.

The electro-optic material is one which exhibits birefringence as a linear function of the voltage and field applied. As the birefringence of the electro-optic material varies the eccentricity of the elliptical field produced by the electro-optic material varies and that component of the field which is perpendicular to the plane polarized input radiation increases. An analyzer or a plane polarizer selects a component of the elliptical field for exposing a photosensitive medium.

An analyzer which selects the perpendicular component is supplying light to the photosensitive medium in inverse proportion to the density of the transparency and is effecting image enhancing. An analyzer which selects the component parallel to the plane polarized input radiation is supplying light to the photosensitive medium in direct proportion to the density of the transparency and is effecting dodging.

Certain types of crystals, when exposed to an electric field, undergo changes in their optical properties. This electro-optic effect may be maximized when the electric field and the direction of the light through the crystal are optimized. Polarized light transmitted through such crystals forms components along the X and along the Y axes and the velocity of the light along those axes is a function of the electric field. Hence, the X and Y axes exhibit different indices of refraction, a characteristic referred to as birefringence. Because of the dissimilar velocities that the light components experience along the X and Y axes, these orthogonal components are phase-shifted relative to one another as they pass along these paths.

In such crystals the birefringence, thus the relative phase shift, is a function of the thickness of the crystal along the direction of travel of the radiation through the crystal and the strength of the applied electric field; if the applied field is zero, no birefringence is exhibited. One such class of devices in which the birefringence may be varied by means of an electric field are known as Pockel's devices. A similar optical effect is exhibited by another type of crystal without application of an electric field. With such crystals the relative phase shift or retardation between the components along each axis is determined by the thickness of the crystal.

When in either type of crystal linearly polarized light is applied the relative phase shift between the orthogonal components parallel to the fast and slow axes results in elliptically polarized light, the elliptical eccentricity being a function of the phase shift or retardation introduced by the electro-optic material. Analysis of this elliptically polarized light by a polarizer material produces light whose intensity is a function of the ellipticity of, thus the birefringence, of the crystal. In cases where the electro-optic crystal is used, the intensity of the light from the polarizer is also a function of the electric field applied to the crystal.

Figure 2:
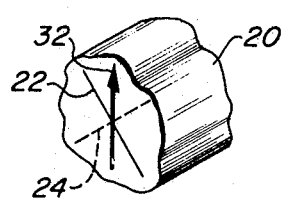
FIG. 2 is a perspective view of a crystallite exhibiting a birefringent effect.

A typical element 10 formed of a photoconductive layer 12 and electro-optic layer 14 between transparent electrodes 16 and 18 is shown in FIG. 1. Electro-optic layer 14 exhibits birefringence as previously discussed. A particle or crystallite 20 of a typical birefringent material is shown in FIG. 2 where the X and Y axes are referred to as the fast axis 22 and slow axis 24 in reference to the different velocities of light through each. Element 10 may also be formed of one layer of a single material which exhibits both the photoconductive and electro-optic characteristics.

The vector sum of the radiation traveling along those axes defines an elliptically polarized radiation field. At 0° retardation (R), FIG. 3, this elliptical field takes the form of a straight line 26, equivalent to its major axis, i.e. a special case of an ellipse, which bisects the right angle between the slow and fast axes. In the case where the slow and fast axes are oriented as shown in FIG. 2, the straight line is vertical as shown in the 0°=R position in FIG. 3. As the retardation increases from 0° the field takes the form of a recognizable ellipse. As the retardation increases from 0° to 90° the major axis 26 of the ellipse becomes shorter while the minor axis 28 becomes longer, causing decrease in the eccentricity of the ellipse. At 90° retardation shown at the R=90° position in FIG. 3 the major 26 and minor 28 axes are equal in length, i.e. the ellipse becomes a circle.

Figure 3:
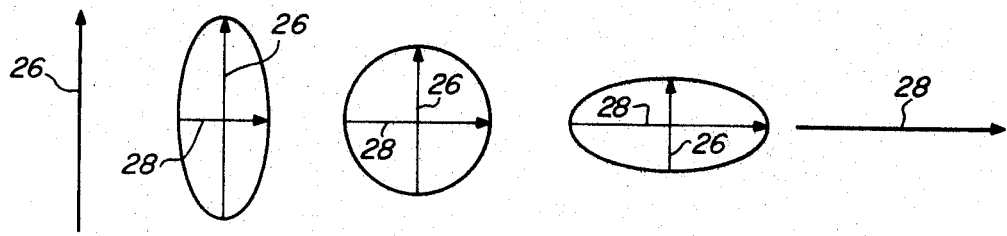
FIG. 3 is a representation of the varying elliptical field produced by the relative retardation introduced by a birefringent material.

Between 90° and 180° as shown in the 90°≦R≦180° position of FIG. 3 the major 26 axis lengthens while the minor 28 axis shortens causing an increase in eccentricity of the ellipse. At 180° retardation as shown in the R=180° position of FIG. 3 the ellipse has degenerated into a horizontal line equivalent to its minor axis 26.

It is apparent, then, that if plane polarized radiation is directed onto crystallite 20 so that the plane of polarization represented by vector 32 bisects the angle of intersection of the fast 22 and slow 24 axes, the amplitude of the radiation passing along each of the slow 24 and fast 22 axes will be equal. And if the birefringent crystallite 20 is formed with a thickness $t$ calculated to produce a relative retardation or phase difference, between the radiation wave 34, FIG. 4, travelling along the fast axis 22 and the radiation wave 36 travelling along the slow axis 24, of 90° ($\pi/2$) or a quarter wavelength $\lambda/4$, FIG. 4, the output radiation from crystallite 20 will be circularly polarized.

If the thickness $t$ is decreased from the dimension which provides a quarter wavelength ($\lambda/4$) retardation, waves 34 and 36 will emerge sooner and their relative retardation will be decreased. As the relative retardation decreases the major axis 26, the component of output radiation parallel to the plane of polarization of the input radiation, vector 32, increases and the minor axis 28, the component perpendicular to the input radiation, decreases, FIG. 3, until at zero thickness there is zero retardation or phase difference and there is no perpendicular component, only the parallel component which is equal to the vertically polarized input radiation indicated at 26, FIG. 3. Similarly, if thickness $t$ is increased from the dimension which provides a quarter wavelength ($\lambda/4$) retardation waves 34 and 36 will emerge later and their relative retardation will be increased. As the relative retardation increases the parallel component decreases and the perpendicular component increases until $t$ reaches the dimension at which the retardation is 180° where only the perpendicular component exists. At 180° retardation perpendicular component is equal to the input radiation but perpendicular to it as represented by line equivalent to the minor axis 28 at the $R=180°$ position of FIG. 3. An element which provides a 90° phase shift or retardation is often referred to as a quarter wave plate and an element which provides 180° phase shift or retardation is often referred to as a half wave plate. A half wave plate rotates the input radiation field 90° as can be seen by comparing the vectors at the 0° and 180° positions depicted in FIG. 3.

Figure 4:
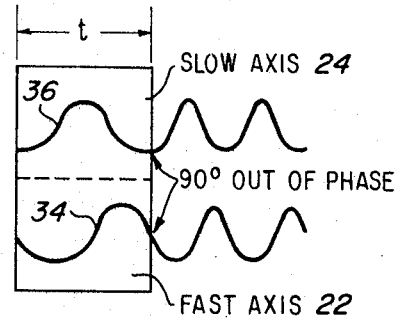
FIG. 4 is a representation of the relative retardation introduced between two radiant waves by a birefringent material.
Figure 5:
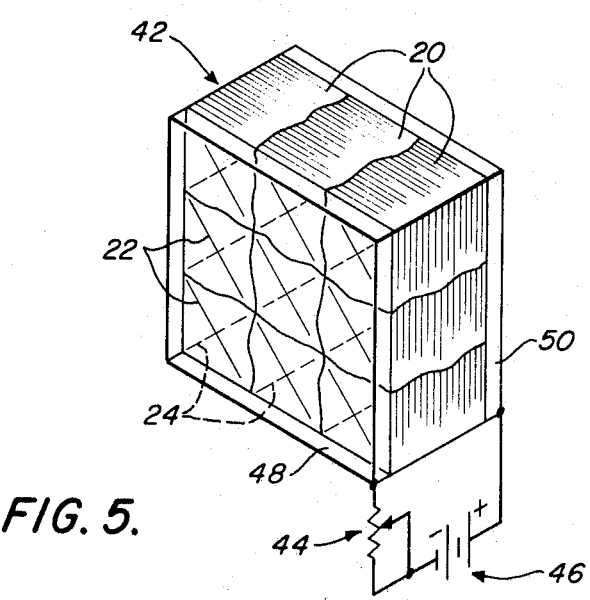
FIG. 5 is a schematic perspective view of an electro-optic material known as a Pockel's device which exhibits variations in birefringence with variations in an applied electric field.

The same phase shifting or retardation effects on the radiation passing along the slow and fast axes produced by varying the thickness $t$, discussed with reference to FIGS. 3 and 4, may be produced in a Pockel's device having a constant thickness $t$ by varying the applied voltage across the Pockel's device 42 as for example by means of a potentiometer 44 connected in line with battery 46 across electrodes 48 and 50. A Pockel's device 42 includes many crystallites 20 each of which exhibits birefringence along slow 24 and fast 22 axes. The device 42 may be fabricated or grown so that all slow axes 24 are aligned in the same direction and all fast axes 22 are aligned in the same direction, the slow and fast axes being mutually perpendicular. Pockel's device 42, FIG. 5, has a uniform field across it provided by battery 46 through electrodes 48 and 50, so each crystallite 20 exhibits the same retardation; and radiation entering at every point on the surface of device 42 will emerge elliptically polarized to the same degree. If the field is non-uniform on device 42 the elliptical polarization of the radiation will vary in correspondence with the field.

Figure 6:
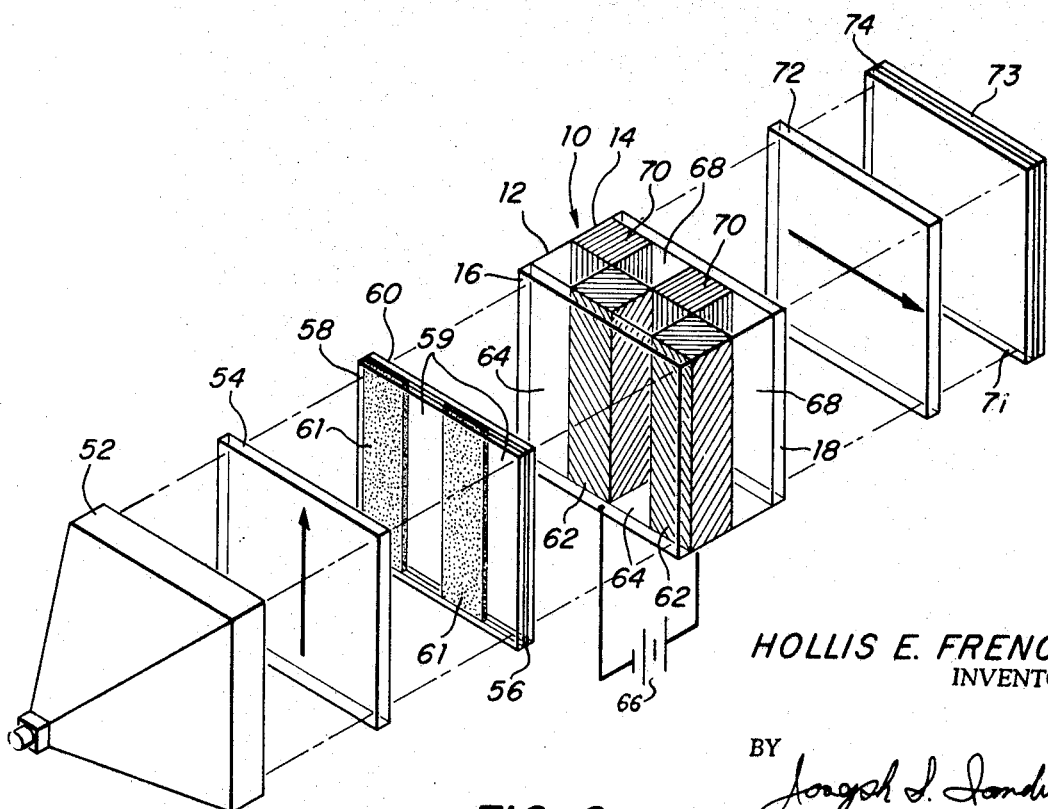
FIG. 6 is a diagrammatic perspective view of an arrangement for providing image enhancing or dodging of a photograph.

An embodiment of the invention in which electro-optic layer 14 is a Pockel's device and is combined in a single element 10 with a photoconductive layer 12 is shown in FIG. 6. Physical contact between layers 12 and 14 is not necessary but electrical contact is necessary.

Collimated light from source 52 passes through plane polarizer 54 so that transparency 56 supported between glass plates 58, 60 is uniformly irradiated. Since transparency 56 does not have uniform density, the intensity of the light reaching photoconductive layer 12 through electrode 16 is non-uniform and varies in inverse proportion to the density of transparency 56: more light passes through less dense areas 59 of transparency 56 and less light passes through more dense areas 61 of transparency 56.

Photoconductive layer 12 is a material whose conductance varies directly with the intensity of the light incident on it. That is, the conductance is increased by exposure to light. Therefore the more intense light coming from the less dense areas 59 of transparency 56 increases the conductance of sections 62 in layer 12, while little or no light passes through the more dense areas 61 of transparency 56 and sections 64 remain at substantially the normal conductance of layer 12.

A D.C. voltage applied across electrodes 16 and 18 by battery 66 creates a uniform field across electrodes 16 and 18. But, because of the variations of the conductance of layer 12 caused by the light incident on that layer in a pattern corresponding to the density of transparency 56, the voltage and field across increased conductance sections 62 are diminished and, thus, the adjacent segments 68 of layer 14 are subject to a greater portion of the voltage and field between electrodes 16 and 18. And the voltage and field across normal conductance sections 64 are undiminished so that adjacent segments 70 of layer 14 receive a lesser portion of the total field and voltage between electrodes 16 and 18 than do segments 68. Layer 12 is in effect acting as a voltage divider: the percentage of the voltage or field allotted to layer 14 is dependent upon the amount of increase of the conductance of layer 12.

Since the birefringence of layer 14 increases with increase in applied voltage or field, the light passing through segments 68 will have a larger cross-component or perpendicular component than the light passing through segments 70.

An analyzer which may be in the form of a polarizer 72 interposed between layer 14 and a photosensitive medium 74 supported by glass plates 71 and 73, on which the image borne by transparency 56 is to be printed, may be positioned to select the perpendicular component of the elliptically polarized output light from layer 14. Since the perpendicular component increases with increasing birefringence which increases with increases in the applied field, the intensity of the perpendicular component selected by polarizer 72 is inversely proportional to the density of the transparency. As a result the image being transmitted to photosensitive medium 74 is undergoing image enhancement.

If polarizer 72 is rotated 90° so that the parallel component, FIG. 3, of the elliptically polarized output radiation from layer 14 is selected, dodging of the image will take place. This is so because the parallel component decreases with decreasing birefringence which decreases with decreases in the applied field; the intensity of the parallel component selected by polarizer 72 is then directly proportional to the density of the transparency.

Figure 7:
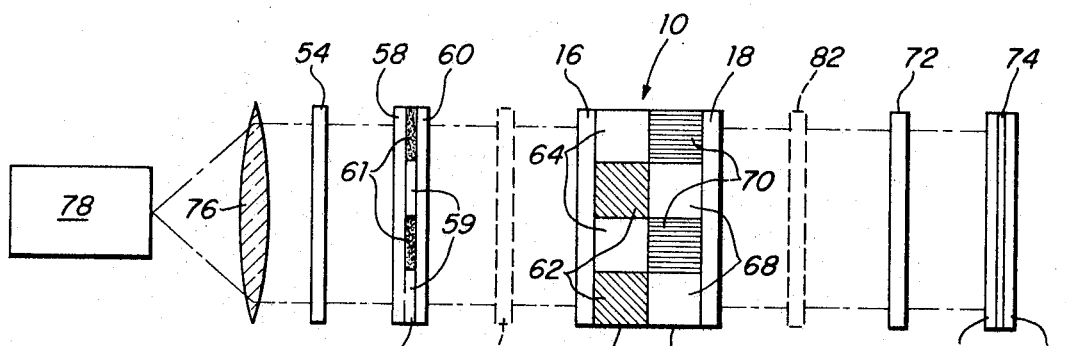
FIG. 7 is a diagrammatic top view of another arrangement for providing image enhancing or dodging of a photograph similar to FIG. 6.

An alternative embodiment using a lens 76 to collimate light from a narrow light source 78 is shown in top view in FIG. 7 where like elements have been shown with like numbers. Additionally in the embodiment of FIG. 7 a quarter wave plate 80 may be positioned between source 78 and element 10, preferably between plane polarizer 54 and transparency 56 or between transparency 56 and element 10, to convert the plane polarized light into elliptically polarized light. Such a quarter wave plate is made from birefringent material sized to provide a 90° phase shift or retardation between its slow and fast axes, see discussion of FIGS. 3 and 4. By orienting plate 80 so that the plane polarized light from polarizer 54 bisects the angle between the fast and slow axes, circularly polarized light is obtained. When circularly polarized light is used to irradiate element 10 the light emerging from those areas of layer 14 in which there is no field and no birefringent effect is circularly polarized, whereas that emerging from areas of layer 14 in which there is a substantial birefringent effect has been distorted to another elliptical form.

A second quarter wave plate 82 interposed between element 10 and medium 74 is oriented so that the positions of its fast and slow axes are interchanged relative to the positions of those axes in plate 80. Plate 82 thereby compensates for the action of plate 80 and the light reaching polarizer 72 will, as a result, be elliptically polarized light derived solely from the birefringence of layer 14. Polarizer 72 may be used to produce either image enhancing or image dodging as previously explained.

One advantage which derives from using circularly polarized input light is a result of the rotation of the field which supplies polarized light of constantly changing direction. Thus Pockel's devices in which the slow and fast axes of each crystallite are misaligned with respect to those axes in every other crystallite in the device may be used in the apparatus: the rotating field produces output light from such a device which is independent of my misalignment of the crystallites.

Figure 8:
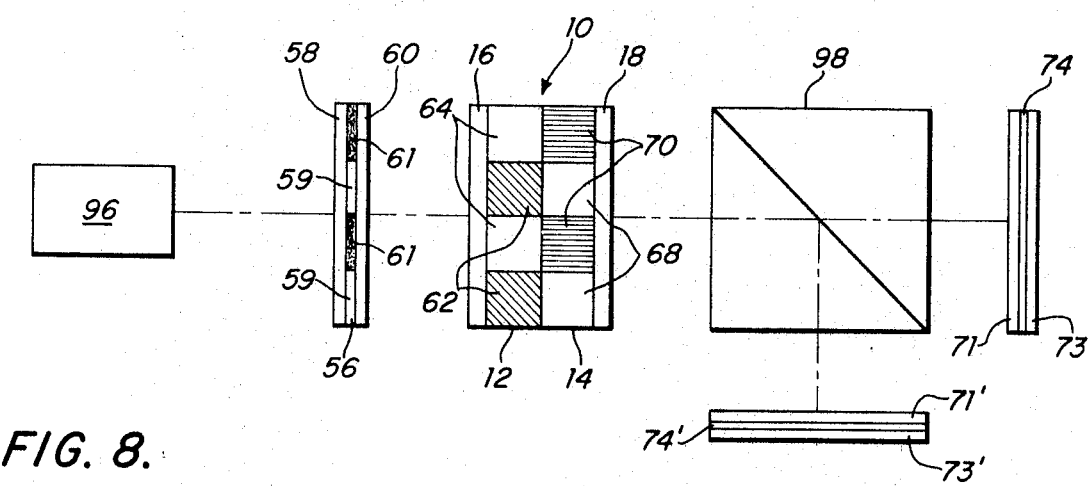
FIG. 8 is a diagrammatic view of an arrangement similar to FIG. 7 capable of simultaneously providing a dodged and an enhanced print.

In another embodiment, FIG. 8, light is supplied by source 96 and crystal 98, such as a Rochon, Glan, or Glan-Thompson crystal, may be used as the analyzer in place of polarizer 72. Such crystals refract the light polarized in one plane in one direction and the light polarized in a second plane perpendicular to the first in a second direction. Thus, if the perpendicular component is projected to medium 74 and the parallel component is projected to medium 74' two photographs, one dodged, the other enhanced, can be simultaneously printed.

Various materials may be used as a photoconductive layer and various types of radiation may be used to vary the conductance depending upon its composition. Typically the electro-optic material may be formed of potassium dihydrogen orthophosphate (KDP), the photoconductive layer may be formed of crystalline selenium or cadmium sulfide, and the photosensitive medium may be visible light sensitive photographic paper or orthochromatic or panchromatic film. The radiation used to expose the photoconductive layer or photosensitive medium need not be collimated if the components of the system are in intimate contact. The arrangements of the photoconductive layer, electro-optic layer, transparency, and conductance varying radiation source may take many forms. For example: the photoconductive and electro-optic layers need not be in physical contact as long as the conductance variation effect is used to influence the applied electric field; the transparency may be a portion of a film strip supported by rollers or the like, and the glass plates may be eliminated or substituted for; similarly the photosensitive medium may be a portion of a larger film strip; the conductance varying radiation source may provide only a narrow slit of radiation and/or be but a narrow section of material; one or more of the transparency, source, and photoconductive layer may be moved relative to each other in a direction transverse to the slit of radiation; similarly the electro-optic layer may provide only a narrow slit of light and/or be but a narrow section of material.

Other embodiments will occur to those skilled in the art and are within the following claims.

What is claimed is:

1. Apparatus for modifying the contrast of a photographic image during printing comprising:
   a photoconductive material whose conductance varies in proportion to the intensity of applied radiation;
   an electro-optic material, exhibiting a characteristic that varies with variations of an applied electric field, associated with said photoconductive material for modulating output radiation transmitted by said electro-optic material;
   first means for exposing said photoconductive material with input radiation through an image-bearing transparency to vary the conductance of said photoconductive material in a pattern corresponding to the density distribution of the image borne by said transparency and for exposing said electro-optic material to input radiation;
   means for applying, across said photoconductive material and said electro-optic material, an electric field which varies at said electro-optic material as a function of the conductance pattern of said photoconductive material; and
   second means for exposing a photosensitive medium to a portion of the modulated output radiation produced by said electro-optic material, the intensity of said portion of said modulated output radiation varying in a pattern corresponding to the density distribution of the image borne by said transparency.

2. The apparatus of claim 1 in which said electro-optic material is a material whose birefringence varies with variations of an applied electric field.

3. The apparatus of claim 1 in which said electro-optic material and said photoconductive material are two separate materials each exhibiting the characteristics of a different one of the materials.

4. The apparatus of claim 2 in which said first means for exposing includes means for irradiating said electro-optic material with polarized input radiation.

5. The apparatus of claim 4 in which said electro-optic material modulates said polarized input radiation transmitted through it to produce elliptically polarized output radiation whose eccentricity varies with variations in the applied electric field.

6. The apparatus of claim 5 in which said second means for exposing includes analyzing means for selecting at least one component of said elliptically polarized output radiation representative of the variations of the density distribution of the image borne by said transparency.

7. The apparatus of claim 6 in which said input polarized radiation is plane polarized, said second means for exposing selects a plane polarized output component perpendicular to said plane polarized input radiation, and said photosensitive medium is exposed to said perpendicularly plane polarized output component which varies in indirect proportion to the density of said transparency.

8. The apparatus of claim 6 in which said input polarized radiation is plane polarized, said second means for exposing selects a plane polarized output component parallel to said plane polarized radiation, and said photosensitive medium is exposed to said parallel plane polarized output component which varies in direct proportion to the density of said transparency.

9. The apparatus of claim 6 in which said first means for exposing includes a radiation source and first support means for positioning said transparency between said photoconductive material and said radiation source.

10. The apparatus of claim 6 in which said means for applying an electric field includes:
    a first electrode connected to said photoconductive material and a second electrode connected to said electro-optic material, said electrodes being transparent to the applied radiation; and
    a source of electrical energy for providing a voltage across said electrodes.

11. The apparatus of claim 6 in which said photoconductive material and said electro-optic material have an interface.

12. The apparatus of claim 6 in which said second means for exposing includes second support means for positioning said photosensitive medium to receive radiation from said analyzing means.

13. The apparatus of claim 6 in which said polarized input radiation, for exposing said electro-optic material, is plane polarized.

14. The apparatus of claim 6 in which said polarized input radiation, for exposing said electro-optic material, is in the visible light range.

15. The apparatus of claim 6 in which said first means for exposing supplies said input radiation to expose said photoconductive material and supplies said polarized input radiation to expose said electro-optic material simultaneously.

16. The apparatus of claim 6 in which said input radiation for exposing said photoconductive material and said input polarized radiation for exposing said electro-optic material are the same radiation.

17. The apparatus of claim 6 in which said first means for exposing includes means for simultaneously exposing said photoconductive material to the entire pattern of radiation established by the image borne by said transparency.

18. The apparatus of claim 6 in which said first means for exposing said transparency and said photoconductive material are fixed relative to each other during exposure of said photoconductive material.

19. The apparatus of claim 6 in which said electro-optic material, said photoconductive material, said second exposing means and said photosensitive medium are fixed relative to each other during exposure of said photosensitive medium.

20. The apparatus of claim 6 in which said second exposing means includes circular analyzer means.

21. The apparatus of claim 6 in which said second exposing means includes analyzer means for selecting two mutually perpendicular plane polarized output components from the elliptically polarized output radiation.

22. A method of modifying the contrast of photographic images during printing comprising:
   exposing a photoconductive material with input radiation through an image-bearing transparency to vary the conductance of said photoconductive material in a pattern corresponding to the density distribution of the image borne by the transparency;
   applying, across said photoconductive material and an electro-optic material, an electric field which varies at said electro-optic material as a function of the conductance pattern of said photoconductive material;
   exposing said electro-optic material to input radiation; and
   exposing a photosensitive medium to a portion of the modulated output radiation produced by said electro-optic material, the intensity of said portion of said modulated output radiation varying in a pattern corresponding to the density distribution of the image borne by the transparency.

23. The method of claim 22 in which said electro-optic material is exposed with plane polarized light.

24. The method of claim 22 in which said electro-optic material is exposed with visible light.

25. The method of claim 22 in which said photoconductive material is simultaneously exposed to the entire pattern of radiation established by the image borne by said transparency.

References Cited

UNITED STATES PATENTS 3,332,332  7/1967  Blain et al. _____ 355—80

JOHN M. HORAN, Primary Examiner

U.S. Cl. X.R.

355—71